United States Patent [19]

Zimmerman

[11] 4,346,005

[45] Aug. 24, 1982

[54] TUBE SETTLER MODULE

[75] Inventor: Donald R. Zimmerman, Secane, Pa.

[73] Assignee: Crane Co., New York, N.Y.

[21] Appl. No.: 289,581

[22] Filed: Aug. 3, 1981

[51] Int. Cl.³ .......................................... B01D 21/00
[52] U.S. Cl. ................................. 210/232; 210/242.1;
210/521
[58] Field of Search ............ 210/802, 207, 208, 242.1,
210/242.11, 242.2, 242.3, 521, 522, 523, 528,
232, 237, 238

[56] References Cited

U.S. PATENT DOCUMENTS

| | | | |
|---|---|---|---|
| 3,067,878 | 12/1962 | Genter | 210/521 |
| 3,613,889 | 10/1971 | Reed | 210/242.1 |
| 3,830,370 | 8/1974 | Glaeser | 210/242.3 |
| 4,246,111 | 1/1981 | Savard | 210/521 |
| 4,273,654 | 6/1981 | Pielkenrood | 210/522 |
| 4,303,517 | 12/1981 | Love | 210/208 |
| 4,305,819 | 12/1981 | Kobozev | 210/242.1 |

Primary Examiner—Ernest G. Therkorn
Attorney, Agent, or Firm—George S. Schwind

[57] ABSTRACT

This invention discloses a tube settler module for use in clarifiers. The module consists of a plurality of settling media, and has a hangar and a float means both of which enable the module to be readily installed in existing clarifiers, sedimentation tanks or the like without utilizing permanent structural members of said clarifiers or sedimentation tanks.

3 Claims, 5 Drawing Figures

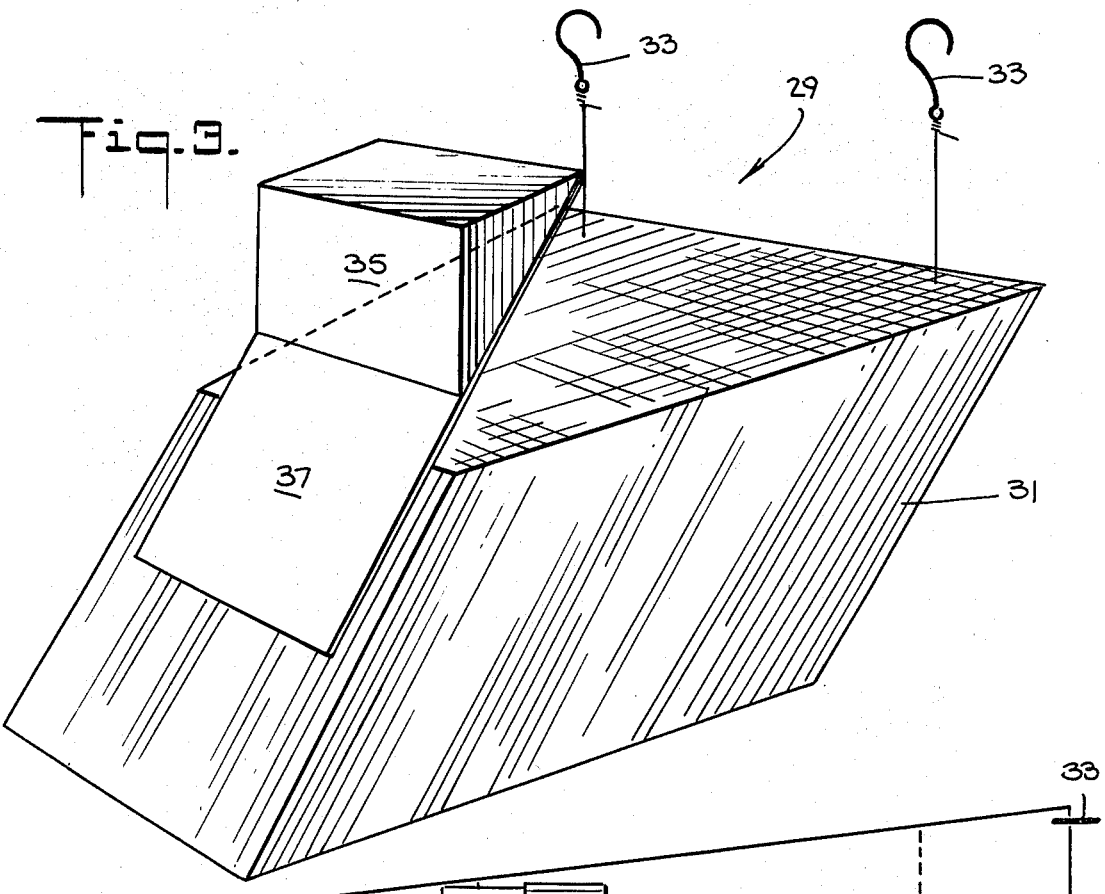
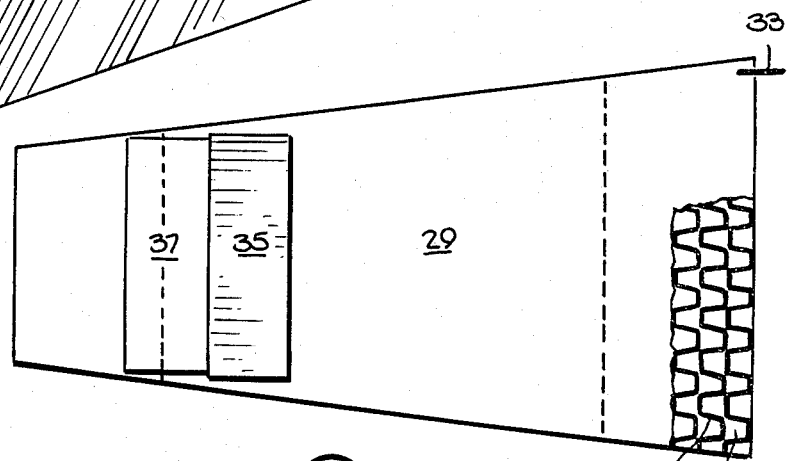
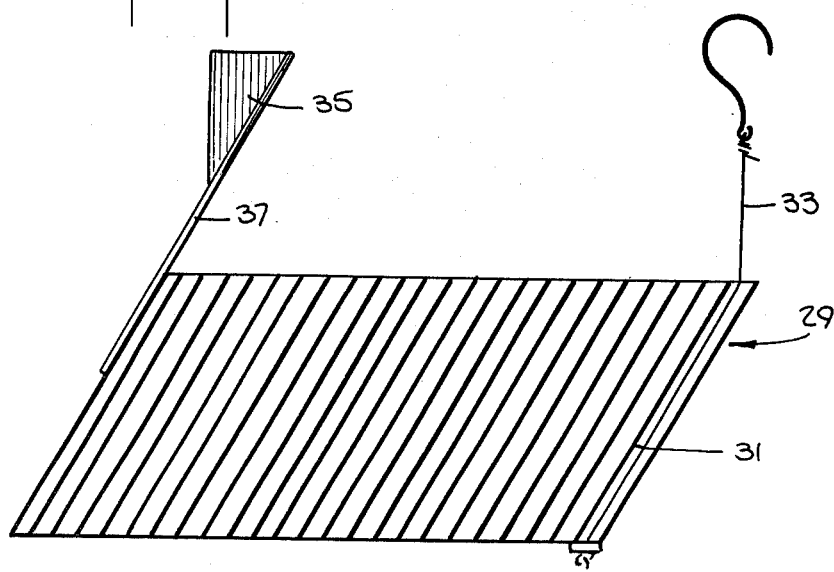

TUBE SETTLER MODULE

BACKGROUND OF THE INVENTION

1. Field of the Invention

This invention relates to clarifiers and, in particular, a tube settler module for use in clarifiers.

2. Description of the Prior Art

Tube settlers are used in water and wastewater clarification applications to increase the rate and efficiency of clarification. A plurality of tube settlers, sometimes connected together in a module or pak, are positioned in a slanted or inclined position, preferably sixty degrees, in fluid in the clarifier. Freed water is passed upward in the clarifier through the tube settlers so that contaminant or settleable particles are collected on the settlers, and via gravity slide down to the lower portion of the settler, while clarified water is completely passed through the settlers. Heretofore, retrofitting of tube settlers has been costly in both down time of the installation and the expense of retrofitting. A contributing factor has been the expensive fixed structural members of the clarifier to which the settlers are removably connected in the clarifier. As such members are costly to repair and install. Further, the connection and disconnection of the settlers to said members takes a relatively long time thereby increasing the time and expense of retrofitting the settlers.

SUMMARY OF THE INVENTION

It is an object of this invention to provide a tube settler module, which module does not need to be affixed to and supported by fixed structural members of the clarifier.

It is another object of this invention to provide a tube settler module having float means.

It is still another object of this invention to provide a tube settler module which is easy to maintain making retrofitting feasible.

It is a further object of this invention to provide a tube settler module which is simple, economical and easy to install.

These and other objects of this invention are provided for by a tube settler module for use in a clarifier having fluid therein. Said module is comprised of a plurality of tube settler media having passage therethrough for effect separation of particles from the influent feed water, and means adapted to suspend said module in the fluid, with said means including at least one float means.

BRIEF DESCRIPTION OF THE DRAWINGS

FIG. 3 is a perspective view of a module of FIG. 1;

FIG. 4 is a top view of a module of FIG. 1 shown in a partial cross-section; and, FIG. 5 is a side view of a module of FIG. 1.

DESCRIPTION OF THE PREFERRED EMBODIMENTS

Figure 1:
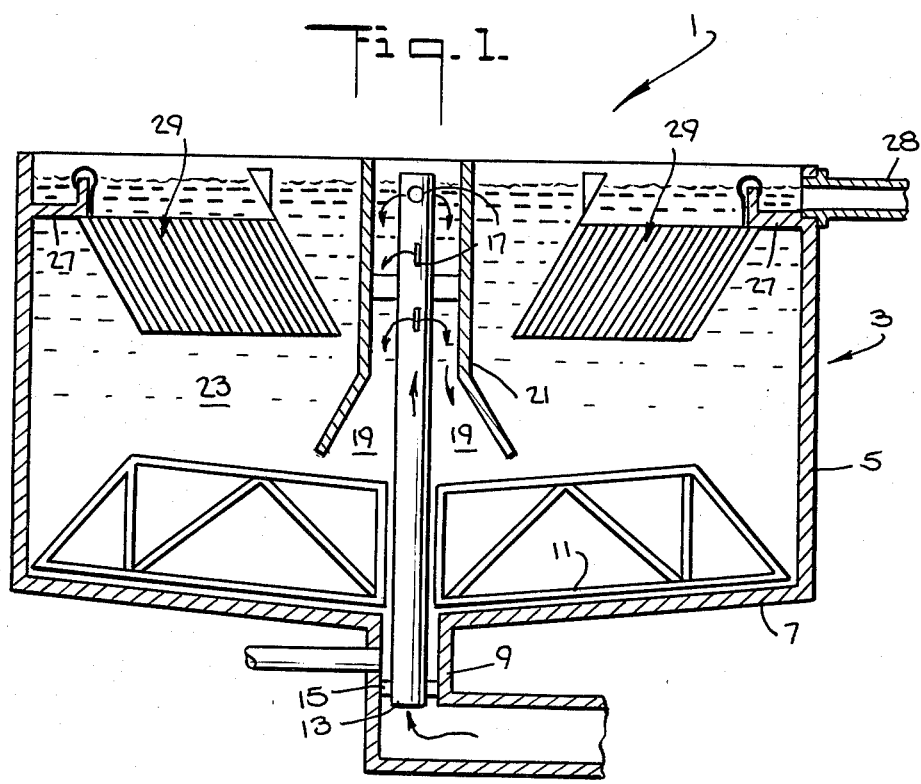
FIG. 1 is a cross-sectional view of a typical circular, center feed, peripheral clarifier showing two modules in operative position.

Referring to the drawings and, in particular, FIG. 1, a typical center feed circular clarifier, generally represented by reference numeral 1, with peripheral effluent launders or collection troughs 27 is shown. Clarifier 1 includes circular tank 3, made of steel or concrete, having sides 5 integral with bottom 7 which, preferably, slopes to sludge removal sump 9. Rake 11, which may or may not be utilized, is positioned in the sludge collection zone of clarifier 1 to direct settled sludge into sump 9 in the usual manner. Incoming fluid, such as feed water, enters clarifier 1 via inlet pipe 13 which is, preferably, positioned through sump 9 but may be positioned to enter clarifier 1 anywhere above rake 11. The feed water is kept from entering sump 9 via seal 15. Inlet pipe 13 has a plurality of orifices 17 which dispense the incoming water (as shown by the arrows).

Figure 2:
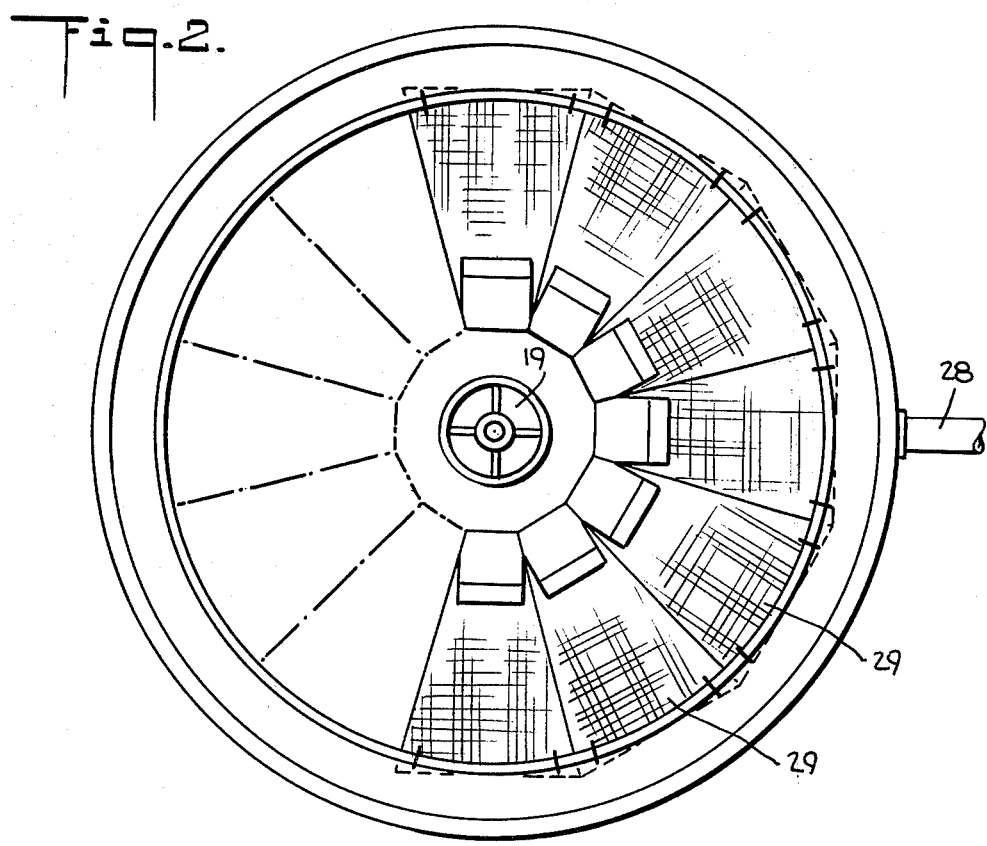
FIG. 2 is a top view of the clarifier of FIG. 1 showing a plurality of modules.

Upon exiting orifices 17, the water is restricted and directed into flocculating zone 19 which is encompassed by flocculating tube 21, as shown. Coagulant chemical feeds may be added to condition the water in flocculator zone 19. Upon departure from flocculator zone 19, the water is directed upward and radially into settling area 23, and through tube settler modules 29, which are located near the top of settling area 23 at effluent launders 27, whereupon clarified water is discharged from clarifier 1 via outlet 28 as shown in FIGS. 1 and 2. It is understood that although a circular, center feed type clarifier with peripheral effluent launders is shown, the proposed tube settler module can be utilized in peripheral feed type clarifiers, rectangular type clarifiers, or center feed clarifiers with radial effluent launders.

To achieve maximum clarification capacity, the tube settlers in the module should be inclined in the clarifier, and the appropriate tube settler rate must be chosen. It has been found that the preferred angle of inclination of the tube settlers with bottom 7 is approximately sixty degrees. Tube settler rate is based on the surface area of the clarifier covered by tube settlers; and, in the general case, said rate is 2.5 to 5 gpm per square foot of surface area. The appropriate tube settler rate depends on the nature of the particles to be settled, desired effluent quality, type and depth of the clarifier and feed water conditions.

Referring to FIG. 3, module 29 includes a plurality of settling media 31, such as tubes, plates and other shapes. Module 29, in the embodiment shown, has a generally pie-shape configuration; however, the configuration may be rectangular, square or other shape. The type of clarifier dictates the configuration of the module to be used; and, in the instant embodiment, the pie-shape configuration is more readily adaptable for use in a circular clarifier.

Media 31 may have numerous cross-sectional configurations including a ripple or corrugated effect. One cross-sectional configuration 32 is shown in FIG. 4.

Referring to FIG. 4, regardless of the cross-sectional configurations, media 31 should provide at least one internal passage 34 for water therethrough, with the passage ranging in diameter from approximately 1 to 5 inches. Discharge of water through passages 34 causes the water containing suspending particles to separate into two streams; i.e., clear water discharged from the top of the media and stream, and settleable particles issuing from the bottom of the media to fall into the sludge collection zone where it accumulates and then is raked by rake 11 into sump 9, shown in FIG. 1, in the usual manner.

Referring to FIGS. 3 through 5, each module 29 has attached to one end hangar or strap means 33 which is suitable for securing to a launder; and has attached to the other end float means 35 to buoy the module in the fluid in the clarifier. Float means 35 is, preferably, triangular in shape, although it may be of any shape, and, may incorporate support 37 or the like. Float means 35 may be secured to media 31 by bonding or other suitable means. Furthermore, float means 35 may be constructed so as to extend above the surface of the fluid in the clarifier to provide a barrier to avoid crossflow across the top surface of each module 29. Float means 35 may be constructed of any buoyant material such as styrofoam, polyethylene, wood, inflatable buoy or any material capable of providing floatation of the module.

Although certain embodiments have been described and illustrated, modification may be made herein, as by adding, combining or subdividing parts or by substituting equivalents while retaining advantages and benefits of the invention, which itself is defined in the following claims:

I claim:

1. A settler system for use in a circular clarifier having a fluid therein with a center feed inlet and a peripheral launder with an outlet, said system comprising:
   (a) a plurality of pie-shaped modules each having a plurality of settler media with passage therethrough for effecting separation of particles from influent feedwater;
   (b) float means attached to the top portion of one end of each module adapted to suspend the module in a fluid, said float means forming a barrier around the center feed inlet to prevent fluid from passing from the inlet to the outlet unless it passes through the settler media; and,
   (c) hangar means attached to the other end of each module adapted to secure said module to the launder.

2. A settler system as defined in claim 1 wherein said modules are arranged in side by side relationship so as to cover substantially the entire surface of the clarifier fluid.

3. A settler system as defined in claim 1 wherein said float means are made of buoyant material.

* * * * *